Patented Oct. 10, 1933

1,930,054

UNITED STATES PATENT OFFICE 1,930,054

PURIFICATION OF ORGANIC ACIDS

Alphons O. Jaeger, Mount Lebanon, and Lloyd C. Daniels, Crafton, Pa., assignors to The Selden Company, Pittsburgh, Pa., a corporation of Delaware No Drawing. Application July 2, 1930
Serial No. 465,446

11 Claims. (Cl. 260—122)

This invention relates to the purification of organic acids produced by vapor phase catalytic reactions.

Organic acids obtained by vapor phase catalytic reactions, for example maleic and phthalic acids from the catalytic oxidation of naphthalene, are contaminated with impurities, many of which are colored. Thus, for example, one fraction of the product from catalytically oxidizing naphthalene contains as its main constituents phthalic acid, maleic acid, fumaric acid, benzoic and mesotartaric acid, and the product is highly colored by reason of the presence of naphthoquinone and polymerization and condensation products of naphthoquinone and tarry substances. Similar tarry oxidation products and other impurities are present in all organic acids produced by vapor phase catalytic oxidation processes, for these reactions progress by the addition of oxygen, with or without the splitting off of water, and this produces other oxidation products than acids. It is difficult to separate these colored impurities from the acids, and in the past the utilization of the crude acids has been restricted by reason of the expense involved in purifying them by the ordinary methods since the common solid decolorizing agents such as activated carbon, silica gel, and the like will not completely decolorize the solution without excessively involved treatments.

According to the present invention an aqueous solution or suspension of the crude acids is subjected to the action of an organic solvent for the colored impurities in which solvent the acids are relatively insoluble. Thus, for example, phenol or cresol may be used, the commercial cresylic acid being very suitable. Other solvents are benzene, toluene, and other hydrocarbons. Various mixed decolorizing solvents may also be used, and where a plurality of solvents are used they may be simultaneously or successively used. Solid decolorizing agents, such as activated carbon, silica gel, alumina gel and the like may be used in combination with the solvents and aid in the purification.

The invention is particularly applicable to the acids obtained by the catalytic oxidation of naphthalene or other aromatic compounds yielding dibasic acids, but is in no sense limited thereto. Mixtures containing maleic acid produced by the catalytic oxidation of furfural, benzene, toluene, solvent naphtha, phenols, tar acids, or other aromatic, aliphatic or heterocyclic compounds may advantageously be purified by the same method, which is also very effective in the purification of naphthalic anhydride, obtained, for example, by the catalytic purification of acenaphthene or acenaphthylene. In fact the method is generally applicable to the purification of organic acids which show low solubility in the organic solvents used in the process.

The invention will be described in greater detail in the following specific examples, it being understood that it is in no sense limited to the details therein set forth.

Example 1

200 parts of the fraction of the converter product from the catalytic oxidation of naphthalene, containing 20%–40% of maleic acid and anhydride and fumaric acid, determined as maleic acid, and 20%–40% of phthalic acid and anhydride, determined as phthalic anhydride, and 5%–10% of naphthaquinone condensation products and other colored impurities, and the remainder water, is treated with 200 parts of water in four successive portions of approximately equal quantities. The extracts vary in ratio of maleic acid-phthalic acid content from practically 100% maleic acid and 0% phthalic acid in the first extract to 25% maleic acid and 75% phthalic acid in the fourth extract. They may be treated separately or together, depending on the purposes for which the purified products are to be used, or the equipment available for the treatment, or both. A preliminary filtration is made to remove undissolved impurities. The solution so obtained is diluted or evaporated to a concentration of between 10% and 40% acid, all determined as maleic acid. The solution is then agitated thoroughly with $\frac{1}{10}$ to $\frac{1}{2}$ its volume of crude cresylic acid and allowed to stand for separation. The layers are then separated by any of the usual means and the aqueous layer may be extracted with a fresh portion of cresylic acid if it is not as light as a pale straw color.

The last portions of the cresylic acid tending to remain in the aqueous layer as an emulsion or as droplets distributed through the body of the aqueous portion can then be removed by extraction with benzol. After the final extraction with benzol or other light aromatic and aliphatic hydrocarbon, the carboxylic acid in the water solution may be isolated by any of the known means.

Example 2

A water extract of the same fraction of the product from the catalytic oxidation of naphthalene may alternatively be treated with a mixture of benzol and cresylic acid using, therefor, mixtures containing up to 50% of benzol, instead of with cresylic acid followed by benzol. In this case, periods of standing for separation of the two layers are shortened and the layers in the separation are more sharply defined.

Instead of benzol, other aromatic or aliphatic hydrocarbons may be used.

*Example 3*

The residue from the aqueous extraction of the impure product of the catalytic oxidation of naphthalene, as obtained according to Example 1, still contains large quantities of phthalic acid or anhydride with minor quantities of maleic acid. Naturally also, the colored impurities tend to remain in this residue. It is purified as follows:

On the assumption that it is 100% phthalic anhydride it is boiled with 5–7 times its weight of water to ensure complete solution of its acid constituents. The acid value of the water suspension is then determined by titration, and alkali as sodium hydroxide or sodium carbonate is added equivalent to 50% neutralization of the acid content. The solution is then allowed to cool, in which case none of the acid alkali salt separates out and the alkali insoluble impurities may be filtered off. The coloring matter entering into solution with the acids is then extracted as outlined in Example 1 or Example 2.

*Example 4*

Any or all of the aqueous extracts obtained as outlined in Example 1 are neutralized before extraction with cresol or cresol-benzol mixtures to any desired extent, provided the neutralization is not carried so far as to get a neutral reaction to litmus. In other words, the extraction of the coloring matter should be performed on aqueous solutions which are at least slightly acid to litmus or other sensitive indicator.

*Example 5*

The colored fractions of the condensate from the catalytic oxidation of furfural, benzol, phenols, crude tar acids, other aromatic, aliphatic or heterocyclic compounds, or their oxygen derivatives are decolorized in the same manner as outlined in any of the above examples, provided the constituent it is desired to recover from the catalytic oxidation is maleic or phthalic acid or both.

*Example 6*

Naphthalic anhydride made by catalytic oxidation of acenaphthene, acenaphthylene or other aromatic compounds or their derivatives is decolorized by dissolving as the acid alkali salt, a treatment similar to that outlined in Example 3 or Example 4. In this case also neutralization may be carried only to the extent necessary for getting sufficient solubility in water or the neutralization may be carried almost to completion, as desired.

The decoloration of the aqueous solutions by cresylic acid or other solvent may be preceded by a treatment with activated carbon, silica gel or other decolorizing solid adsorbent, but preferably if such a combined process is used the treatment with the decolorizing adsorbent should follow rather than precede the treatment with the solvent.

What is claimed as new is:

1. A method of purifying and decolorizing water soluble organic acids obtained by vapor phase catalytic oxidations, which comprises subjecting an aqueous solution of the acid to extraction with a phenolic solvent for the colored impurities, which solvent is not readily miscible with water, separating the solvent from the water and recovering the purified acids from the water solution.

2. A method of purifying and decolorizing water soluble organic polybasic acids, containing impurities resulting from a vapor phase catalytic oxidation which comprises subjecting an aqueous solution of the acid to extraction with a phenolic solvent for the colored impurities, which solvent is not readily miscible with water, separating the solvent from the water and recovering the purified acids from the water solution.

3. A method of purifying and decolorizing a water soluble organic acid of the group which consists of maleic, fumaric, phthalic, naphthalic containing impurities resulting from a vapor phase catalytic oxidation, which comprises subjecting an aqueous solution of the acid to extraction with a phenolic solvent for the colored impurities, which solvent is not readily miscible with water, separating the solvent from the water and recovering the purified acids from the water solution.

4. A method of purifying and decolorizing water soluble organic acids obtained by vapor phase catalytic oxidations, which comprises subjecting an aqueous solution of the acid to extraction with cresylic acid, separating the cresylic acid from the water and recovering the purified acids from the water solution.

5. A method of purifying and decolorizing water soluble organic polybasic acids containing impurities resulting from a vapor phase catalytic oxidation, which comprises subjecting an aqueous solution of the acid to extraction with cresylic acid, separating the cresylic acid from the water and recovering the purified acids from the water solution.

6. A method of purifying and decolorizing a water soluble organic acid of the group which consists of maleic, fumaric, phthalic, naphthalic, containing impurities resulting from a vapor phase oxidation which comprises subjecting an aqueous solution of the acid to extraction with cresylic acid, separating the cresylic acid from the water and recovering the purified acids from the water solution.

7. A method of purifying and decolorizing water soluble organic acids obtained by vapor phase catalytic oxidations, which comprises subjecting an aqueous solution of the acids to extraction with a plurality of solvents selected from the group consisting of mononuclear phenols and mononuclear aromatic hydrocarbons, at least one solvent being partially dispersable with water and at least one solvent being miscible with the first solvent but substantially indispersable with water, the treatment with the partially dispersable solvent preceding the non-dispersable solvent, separating the solvents from the aqueous layer and recovering the purified acids from the water solution.

8. A method of purifying and decolorizing water soluble organic acids obtained by vapor phase catalytic oxidations, which comprises subjecting an aqueous solution of the acids to extraction with a plurality of solvents, at least one being a mononuclear phenolic solvent and at least one being a mononuclear hydrocarbon solvent, the treatment with the phenolic solvent preceding the treatment with the hydrocarbon solvent.

9. A method of purifying an impure organic acid product containing phthalic acid and colored impurities resulting from a vapor phase oxidation, which comprises subjecting an aqueous solution of the acid to extraction with an aromatic solvent selected from the group consisting of mononuclear phenols and mononuclear aromatic hydrocarbons which is relatively non-miscible with water.

10. A method of purifying an impure organic acid product containing naphthalic acid and colored impurities resulting from a vapor phase catalytic oxidation, which comprises subjecting an aqueous solution of the acid to extraction with an organic solvent selected from the group consisting of mononuclear phenols and mononuclear aromatic hydrocarbons which is relatively non-miscible with water.

11. A method according to claim 1 in which a mixture of phenolic solvent and a hydrocarbon is used.

ALPHONS O. JAEGER.
LLOYD C. DANIELS.